Patented Mar. 11, 1930

1,750,583

UNITED STATES PATENT OFFICE

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA

COMPOSITION CONTAINING CHLOR RUBBER

No Drawing. Application filed October 27, 1922, Serial No. 597,416. Renewed December 11, 1929.

This invention relates to a composition containing chlor rubber and relates especially to films, sheets and the like containing this material, or to cloth, leather and the like having a facing or backing or impregnated with chlor rubber.

In my prior applications relating to chlor rubber, for example Serial 442,245 and Serial 480,565, (now Patents 1,541,693 and 1,544,529, respectively) I have referred to the use of homogenizing or softening agents as for example the phenolic phosphates, alone or mixed with camphor and kindred terpene substances of a solid nature. The present invention is likewise concerned, in its preferred embodiment, with such homogenizing or softening agents which permit the production of films or sheets of a pliable character capable of being used to some extent at least in substitution for inflammable films of nitrocellulose. Chlor rubber has the advantage of being non-inflammable and very difficult in fact to ignite. While nitrocellulose films will burn in an almost explosive fashion and films of cellulose acetate will very readily ignite and burn, those made from highly chlorinated rubber show a high degree of resistance to ignition. On the application of strong heat the film will crackle and shrivel without actual inflaming.

Chlor rubber of the proper degree of solubility is inclined to be brittle so that films made of it when sharply bent will break much more easily than nitrocellulose films. The addition of a homogenizing or softening agent such as a camphor mixture, triphenyl or tricresyl phosphate, diethyl phthalate or highly chlorinated hydrocarbons such as pentachlorethane have a useful homogenizing and softening action. The tendency of chlor rubber to dry from its solution with a certain amount of segragation causing spots or roughened surface is diminished when some of these substances are present.

For coating cloth to make artificial leather and for use in producing patent leather fairly concentrated solutions of chlor rubber are desirable. Rubber which has been chlorinated by treatment under pressure of 100 to 140 pounds chlorine gas until chlorinated throughout to for example the deca chlor compound has a very high degree of solubility far superior to that of nitrocellulose. It does not dissolve however in many of the common nitrocellulose solvents but is readily soluble in hydrocarbon solvents such as benzol, toluol, solvent naphtha, also carbon tetrachloride, trichlorethylene, carbon bisulphide etc. In the present invention I prefer a product containing over 60 per cent of combined chlorine and preferably 70–75 per cent. This gives a product (hereinafter referred to as "highly chlorinated rubber") which will dissolve in benzol to make a solution say of 40 per cent strength. The dried product is very hard and fairly tough but possesses a certain degree of brittleness which is diminished by the addition of a softening agent as aforesaid.

Thus I may employ—A. Chlor rubber 10 parts by weight, toluol 25 parts, triphenyl phosphate 4 parts.

B. Chlor rubber 10 parts, toluol 25 parts, diethyl phthalate 2 parts, triphenyl phosphate 1 part.

C. Chlor rubber 10 parts, carbon bisulphide 25 parts, diethyl phthalate 1 part, triphenyl phosphate 2 parts.

D. Chlor rubber 10 parts, toluol 25 parts, diethyl phthalate 2 parts, camphor 2 parts.

E. Chlor rubber 9 parts, benzol 24 parts, camphor 1 part, diethyl phthalate 2 parts, pentachlorethane ½ part.

F. Chlor rubber 14 parts, benzol 20 parts, toluol 20 parts, camphor and diethyl phthalate each 1 part.

G. Chlor rubber 10 parts, benzol 50 parts, camphor and diethyl phthalate each 1½ parts.

The plasticizing agents or softening agents above mentioned, are all relatively non-volatile, that is to say they remain permanently admixed with the chlorinated rubber, and none of these boil except when heated to temperatures above that at which highly chlorinated rubber itself would begin to decompose. These substances are thereby distinguished from the readily volatile solvents of highly chlorinated rubber, such as benzol and carbon-tetrachlorid, by being relatively non-volatile.

When solutions of chlor rubber such as some of the foregoing are poured out on glass and allowed to dry to form films it is observed as the film sets bubbles will form. Sometimes these will be very abundant and other times single bubbles at points a considerable distance apart. However, the appearance of the film is seriously impaired because of such bubbles. In case of formula G the solution was distilled until 25 parts (i. e. one half) of the benzol had been removed. When this was poured on glass a clear film was obtained showing that the bubbles were probably due to air or gases present in the solution and incapable of being absorbed or liberated by passage through the film during the drying. The occurrence was noticed particularly with benzol and carbon bisulphide solvents, toluol and solvent naphtha being much less likely to produce bubbly films. On the other hand the surface of the film with benzol was smoother and less inclined to be ripply than when toluol was used. This method of distillation therefore provides the means of using quite volatile solvents for chlor rubber to form films which may be rapidly dried without the occurrence of bubbles.

The degasification or elimination from the solution or film-forming dope, of the bodies causing the bubbles therefore constitutes one phase of the present invention.

The color of the films obtained is not as light as is required for some purposes and the solutions of the chlor rubber may be bleached by means of fuller's earth, infusorial earth and the like, as for example by boiling with the bleaching agent under a reflux condenser, then filtering or if the solution is quite viscous employing a centrifuge to remove the bleaching agent. This bleaching treatment may be applied to the foregoing solutions to reduce or eliminate the brownish tone, such bleaching operation yields a product within the scope of the present invention.

The result of the foregoing is a product which in its preferred form is a transparent, light colored film free from bubbles and possessing a considerable degree of pliability and strength; such film being without support or if desired having a backing of cloth, leather and the like. Pigments may be incorporated with it if desired. In addition to films and coatings the product may also be in the form of threads, strips, blocks, etc.

The present invention also comprises the process of treating chlor rubber solutions to make them adapted for the formation of rapidly drying coatings or films free from bubbles consisting in boiling the solution to eliminate bubble-forming gases or treating with a substance which absorbs gases or in vacuo etc. and also bleaching the solution to remove the brown tone commonly found in chlor rubber; the step of bleaching being carried out preferably by boiling under a reflux condenser with fuller's earth or other suitable bleaching agent and then removing the bleaching agent preferably by centrifuging.

The coating of fabrics with chlorinated rubber compositions has been claimed in a separate application 706,880, such being in response to an official requirement for division.

What I claim is:—

1. A chlorinated rubber composition comprising chlorinated rubber, di-ethyl phthalate and camphor.

2. A composition of matter comprising an intimate admixture of chlorinated rubber and a phthalic acid ester which is compatible therewith.

3. A composition of matter comprising chlorinated rubber and diethyl phthalate capable of acting as a softener therefor.

CARLETON ELLIS.